United States Patent [19]

Shenoy et al.

[11] Patent Number: 5,594,706
[45] Date of Patent: Jan. 14, 1997

[54] DOWNHOLE PROCESSING OF SONIC WAVEFORM INFORMATION

[75] Inventors: Ramachandra Shenoy, W. Redding; Shu-Kong Chang, Redding, both of Conn.

[73] Assignee: Schlumberger Technology Corporation, Ridgefield, Conn.

[21] Appl. No.: 170,567

[22] Filed: Dec. 20, 1993

[51] Int. Cl.$^6$ .................................................. G01V 1/40
[52] U.S. Cl. ........................ 367/76; 367/25; 367/43; 367/45; 367/74; 364/422
[58] Field of Search ........................... 367/21, 25, 43, 367/45, 74, 76; 364/421, 422; 375/122

[56] References Cited

U.S. PATENT DOCUMENTS

| | | | |
|---|---|---|---|
| 4,131,875 | 12/1978 | Ingram | 340/15.5 |
| 4,594,691 | 6/1986 | Kimball | 367/32 |
| 4,803,700 | 2/1989 | Dewey et al. | 375/77 |
| 5,031,155 | 7/1991 | Hsu | 367/25 |
| 5,276,705 | 1/1994 | Higgins | 375/122 |
| 5,294,998 | 3/1994 | Piovoso et al. | 358/428 |
| 5,365,229 | 11/1994 | Gardner et al. | 367/76 |

OTHER PUBLICATIONS

Webster et al, IEEE Trans. on Geosc. and Remote Sensing, vol. GE–19, #2, pp. 91–94, Apr. 1981.
"Efficient Multistage Multirate Digital Filtering of LWD Sonic Waveforms" by Shenoy & Hsu pp. 1–16.
"Efficient slowness computation from sonic waveforms" by Shenoy & Hsu pp. 1–10.
"Slowness estimation from sonic logging waveforms" Geoexploration 27 (1991) pp. 215–256.
"Acquisition & Analysis of Sonic Waveforms From a Borehole Monopole . . ." by Harrison et al. SPE20557 pp. 267–282.
"A New Sonic Array Tool for Full Waveform Logging" by Morris et al, SPE 13285.
"Semblance processing of borehole acoustic array date" by Kimball et al. Geophysics vol. 49, No. 3 pp. 274–281.
*Multirate Digital Signal Processing* pp. 52–57 by Crochiere.
"A Comparison of Efficient Beamforming Algorithm" by Mucci, IEEE Transactions on Acoustics, Speech and Signal Processing, vol. ASSP–32, No. 3. Jun. 1984 pp. 548–558.
"A Novel Approach to Digital Beamforming" by Pridham et al., J. Acoust. Soc. Am. 63(2) Feb. 1978 pp. 425–434.
"Digital Interpolation Beamforming for Low–Pass and Band Pass Signals" by Pridham et al; Proceedings of the IEEE, vol. 67, No. 6, Jun. 1979.
Chap. 5 Porosity Logs from Schlumberger Log Interpretation Principles/Applications, Oct. 1987.

Primary Examiner—Nelson Moskowitz
Attorney, Agent, or Firm—David P. Gordon; Martin D. Hyden; Keith G. W. Smith

[57] ABSTRACT

Methods for processing sonic logging data obtained by a sonic imaging tool or an MWD tool are provided. The sonic logging data are bandpass filtered and sampled according to techniques such as integer band decimation, quadrature modulation, and single side band modulation to provide compressed signals which can be reconstructed if desired. The compressed signals are alternatively stored for downloading and further processing, sent uphole for processing, or processed downhole. The processing preferably involves processing the analytic portion of the compressed signals according to an improved semblance processing technique where the semblance function is calculated over a time window utilizing coarse slowness and time sampling steps. The slowness and time sampling steps are dictated by the parameters of the bandpass filter and the inter-receiver spacing of the tool. The waveform for each receiver is preferably interpolated based on the time step size to provide those data points necessary for stacking. From the determined semblance peaks, or interpolation thereabout, the formation slowness is derived.

34 Claims, 8 Drawing Sheets

DOWNHOLE PROCESSING OF SONIC WAVEFORM INFORMATION

BACKGROUND OF THE INVENTION

1. Field of the Invention

The present invention relates broadly to the processing of information obtained by a sonic borehole tool. More particularly, the invention relates to the downhole processing of compressional sonic wave data via the use of data compression. The invention finds particular use in both logging while drilling applications where the transmission rate of data is limited due to the absence of a telemetry cable, as well as to array sonic tools applications where the data transmission through the telemetry cable is a constraint on the logging rate.

2. State of the Art

Sonic logging is a well developed art, and details relating to sonic logging tools and techniques are set forth in "Porosity Logs"; *Schlumberger Log Interpretation Principles/Applications*, Chapter 5, Schlumberger Educational Services, Texas (1987); A. Kurkjian, et al., "Slowness Estimation from Sonic Logging Waveforms", *Geoexploration*, Vol. 277, pp. 215–256 (1991); C. F. Morris et al., "A New Sonic Array Tool for Full Waveform Logging," *SPE*-13285, Society of Petroleum Engineers (1984); A. R. Harrison et al., "Acquisition and Analysis of Sonic Waveforms From a Borehole Monopole and Dipole Source . . ." *SPE* 20557, pp. 267–282 (September 1990); C. V. Kimball and T. L. Marzetta, "Semblance Processing of Borehole Acoustic Array Data", *Geophysics*, Vol. 49, pp. 274–281 (March 1984); U.S. Pat. No. 4,131,875 to Ingram; and U.S. Pat. No. 4,594,691 to Kimball et al., all of which are hereby incorporated by reference herein in their entireties. A sonic logging tool typically includes a sonic source (transmitter), and a plurality of receivers which are spaced apart by several inches or feet. In the borehole arts, a sonic signal is transmitted from a sonic source and received at the receivers of the borehole tool which are spaced apart from the sonic source, and measurements are made every few inches as the tool is drawn up the borehole. The sonic signal from the transmitter or source enters the formation adjacent the borehole, and the arrival times and perhaps other characteristics of the receiver responses are recorded. Typically, compressional (P-wave), shear (S-wave) and Stoneley arrivals and waves are detected by the receivers and are processed. The processing of the data is often accomplished uphole. Regardless, the information which is recorded is typically used to find formation parameters such as formation slowness (the inverse of sonic speed) and semblance, from which pore pressure, porosity, and other determinations can be made. In certain tools such as the DSI (Dipole Sonic Imager) tool (a trademark of Schlumberger), the sonic signals may even be used to image the formation.

Even though some of the borehole tools of the art can transfer the data uphole via a telemetry cable, because the communications rates are limited, either the rate of movement of the borehole tool through the borehole must be limited, or data must be stored by the borehole tool. Typically, the logging rate is chosen so that all information obtained downhole may be sent via the telemetry cable. It is possible, however, to provide the borehole tool with a memory for storing large amounts of data that are collected downhole. Because it is not feasible to provide the borehole tool with enough memory to store all of the information that could be obtained during a trip through the borehole, the borehole tool might have to be tripped out of the well so that the memory can be downloaded. The borehole tool would then placed back into the borehole so that additional information could be obtained.

Many different techniques for processing the sonic wave signals are known in the art in order to obtain information regarding the borehole and/or formation. Typically, the processing involves digitizing the received signal at a desired sampling rate and then processing the digitized samples according to desired techniques. Examples may be found in U.S. Pat. No. 4,594,691 to Kimball et al. and the references cited therein, as well as in articles such as A. R. Harrison et al., "Acquisition and Analysis of Sonic Waveforms From a Borehole Monopole and Dipole Source . . ." *SPE* 20557, pp. 267–282 (September 1990).

Recently, compressional slowness has been computed using Slowness-Time Coherence (STC) processing. C. V. Kimball and T. L. Marzetta, "Semblance Processing of Borehole Acoustic Array Data", *Geophysics*, Vol. 49, pp. 274–281 (March 1984). In STC processing, the measured signal is time window "filtered" and stacked, and a semblance function is computed. The semblance function relates the presence or absence of an arrival with a particular slowness and particular arrival time. If the assumed slowness and arrival time do not coincide with that of the measured arrival, the semblance takes on a smaller value. Consequently arrivals in the received waveforms manifest themselves as local peaks in a plot of semblance versus slowness and arrival time. These peaks are typically found in a peak-finding routine discussed in the aforementioned article by Kimball and Marzetta.

While not yet available, sonic tools have been proposed for the logging or measuring while drilling (LWD) arts. Sonic LWD will have many potential applications in oil field services including seismic correlation while drilling, pore pressure and porosity determinations, and mechanical property determinations. Because no telemetry cables will be available in these proposed arts, the transfer of data will have to be accomplished via the use of pulses in the flow of the drilling mud (i.e., mud pulse telemetry). With such a limited data transfer mechanism, even with the best data transmission schemes such as are used in the PowerPulse tool produced by (and a trademark of) Anadrill of Sugar Land, Tex., data can only be transferred at a rate of 32 Hz or less. While the drilling penetration rate is very slow relative to normal logging rates, data acquisition still can far exceed the highest data transmission rates in the mud. Thus, in any proposed sonic LWD art, processing of data downhole will be highly desirable, even though the downhole computing power will be limited. Otherwise, much data will have to be stored in the memory of the downhole tool, and frequent trips out will be required.

SUMMARY OF THE INVENTION

It is therefore an object of the invention to provide sonic logging processing techniques which reduce the processing and memory requirements for a sonic logging tool.

It is another object of the invention to band pass filter and band pass sample sonic logging signals in order to reduce the processing and memory requirements of a sonic logging tool.

It is a further object of the invention to provide different bandpass sampling methods which are useful in filtering sonic logging signals so that processing and memory requirements for the sonic logging tool may be reduced.

It is an additional object of the invention to filter and sample sonic logging signals obtained by sonic imaging and proposed LWD sonic tools in order to effectively compress the data.

A further object of the invention is to provide methods for computing semblance and slowness from a band pass filtered and sampled signal where processing requirements are significantly reduced.

Another object of the invention is to provide methods for analytically sampling waveforms to provide compressed signals, and methods for recovering such sonic waveforms from the compressed signals.

In accord with the objects of the invention, a method for processing sonic logging data broadly comprises bandpass filtering the sonic logging data and then sampling the bandpass filtered signal (or a modulated version thereof) to provide compressed signals which can be reconstructed if desired. It will be appreciated that by compressing the data in this manner, sonic data regarding larger portions of the borehole may be stored in the available memory space of the downhole tool, thereby limiting tripping out of the borehole. Likewise, with the compressed signals, the data transmission rate being equal, more information regarding the formation may be transmitted during logging. If desired, the original data may be recovered from the compressed signals, and standard signal processing used to obtain information regarding the formation and/or borehole.

In accord with further aspects of the invention, methods for processing the sampled bandpass filtered signals in order to generate slowness logs are provided. One method of generating a slowness log is to stack the waveforms of the sampled bandpass filtered analytic signals to obtain a coherence stack. The peak of the stacked waveforms is then searched to obtain the slowness. Another method of generating a slowness log is to utilize an improved semblance processing technique. According to the improved semblance processing technique, the semblance function of the analytic signal for each waveform is calculated over a time window utilizing coarse slowness and time sampling steps which are dictated by the parameters of the bandpass filter and the inter-receiver spacing of the tool, and where the waveform for each receiver is interpolated based on the time step size to provide those data points necessary for stacking. From the determined semblance peaks, the slowness may be derived. Alternatively, based on the semblance peaks, the semblances are either interpolated in a slowness-time plane or searched by iteration algorithms in order to obtain the peaks with higher accuracy. These more accurate peaks may then be used to provide a slowness log.

Certain preferred aspects of the invention include: utilizing one of integer band decimation, quadrature modulation, and single side band modulation as the sampling technique for data compression; utilizing the analytic portion of the compressed signal for calculating semblance; and choosing a slowness step for the improved semblance processing technique which is equal to or slightly smaller than the Nyquist sampling rate $\frac{1}{2}f_2(z_M-z_1)$, where $f_2$ is the high frequency of the shifted frequency band, and $z_M-z_1$ is the distance from the m'th receiver of the sonic array to the reference receiver.

According to a further aspect of the invention, the use of a coarse sampling grid is applied to the known semblance processing technique of the art. In particular, the bandwidths for the coherent and incoherent energies of the received waveforms are computed, and the semblance function is sampled on a grid determined by the Nyquist steps on slowness and time. Based on the sampled semblance function, peaks are found, and the results may be interpolated for a finer determination.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
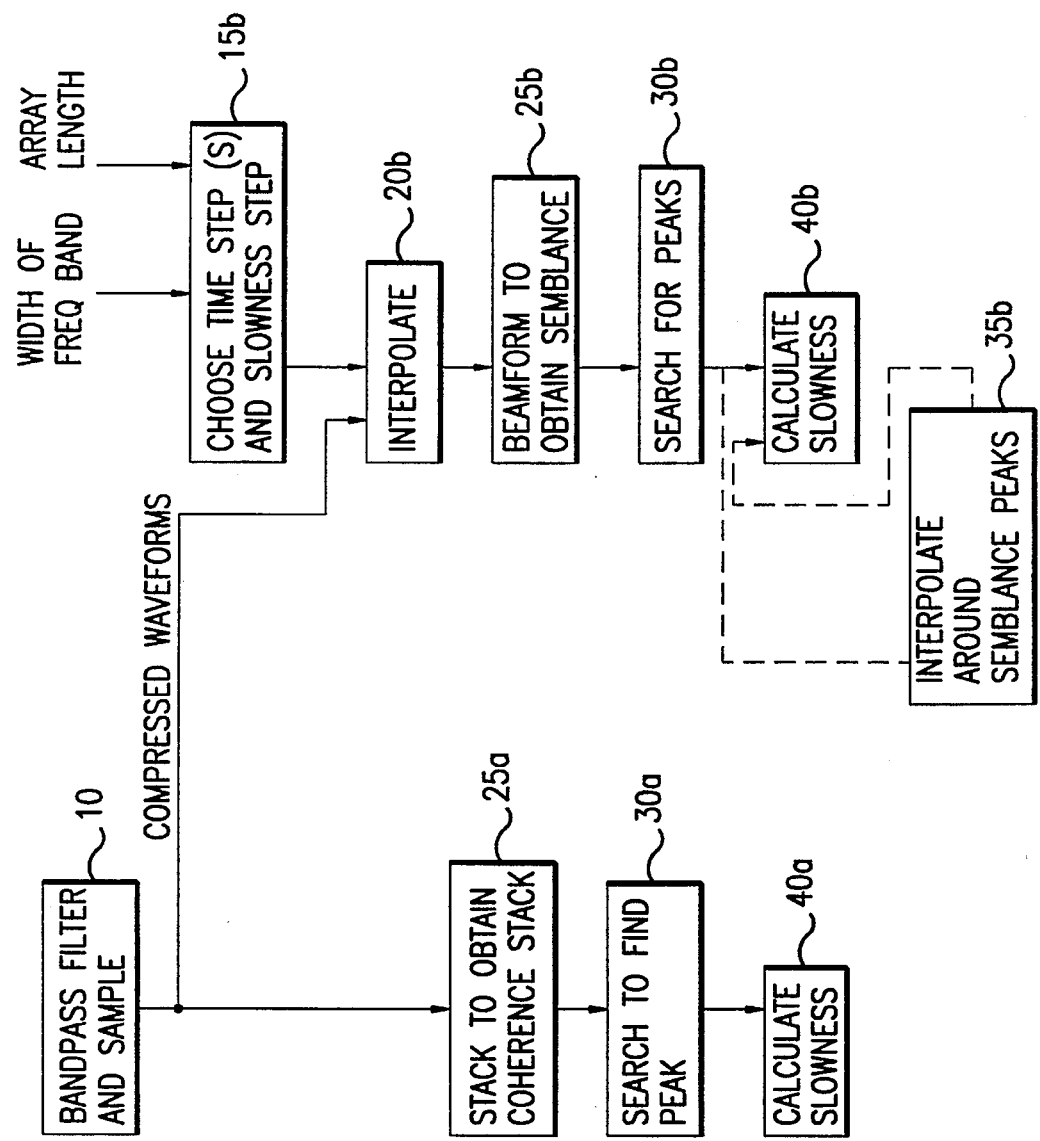
FIG. 1 is a block diagram of the preferred sonic logging processing method of the invention.

Turning to FIG. 1, a block diagram which broadly sets forth the preferred sonic logging processing method of the invention is seen. At step 10, sonic data received at the receivers of a sonic logging tool such as the Dipole Sonic Imager tool (a trademark of Schlumberger) or a proposed sonic MWD tool are bandpass filtered and sampled under control of a downhole processor with associated memory and using analytic sampling or other equivalent techniques. As will be described in greater detail hereinafter, analytic sampling or the equivalent thereof typically involves modulating the incoming signal, bandpass filtering the modulated signal, remodulating the bandpass filtered signal, and sampling the remodulated bandpass filtered signal. As a result of bandpass filtering and sampling the incoming signal or analytically sampling the incoming signal, the data is effectively compressed. The compressed data (whether it is the analytic sample or not) may be stored for processing and/or sent up-hole via a telemetry cable or by mud pulse techniques. As will be discussed below, the original data may be recovered from the compressed, stored or transmitted data. The recovered sonic data may then be processed according to techniques known in the art (e.g., STC processing). Thus, simply by itself, the compression of data by bandpass filtering and sampling or analytically sampling the sonic data in the borehole has significant advantages over the prior art, as it reduces the amount of data which must be transmitted or stored. As a result, the sonic tool or proposed MWD tool may be run at higher speeds, or may obtain a finer granularity of information.

Rather than recovering the original data from the compressed data such that the original data may be processed according to known techniques, in accord with a preferred aspect of the invention, the compressed data is processed directly. According to one embodiment of the invention, at step 25a, the bandpass filtered and sampled waveforms (or alternatively the analytic samples) are stacked in order to obtain a coherence stack. Then, at step 30a, a search of the stacked waveforms is conducted in order to find a peak. At 40a, based on the peak, the slowness is calculated. While such a processing is advantageous in keeping calculations to a minimum, it will be appreciated that the results are not as good as they otherwise might be because the amplitudes of some arrivals in sonic waveforms can be much weaker than other parts of the waveform. One way to equalize such amplitude effects is to use semblance processing. While standard semblance processing could be utilized, in accord with a preferred embodiment of the invention an improved semblance processing is utilized.

The improved semblance processing is seen in FIG. 1 where at step 15b, a time step and slowness step are chosen. The time step relates to the width of the frequency band of the compressed data (i.e., the parameters of the band-pass filter used in analytical sampling), and the slowness step relates to the array length (i.e., the inter-receiver spacing times the number of receivers) of the sonic tool and to the width of the frequency band of the compressed data. Then, at step 20b, the analytic samples of the compressed waveform for each receiver are interpolated with a time step size which relates to the slowness step and the location of the receiver to a reference receiver. While this suggests that for different receivers, different interpolation time steps are utilized, it will be appreciated that while less preferred, equal time steps could be used for all receivers. Preferably, and as will be discussed in more detail hereinafter, the interpolation is conducted only for the points required for stacking. Using the time step(s) and slowness step, at step 25b, a semblance function is obtained by the beamforming the interpolated waveforms. With the calculated semblance functions, semblance peaks are found at step 30b based on a coarse slowness-time grid. Based on the peak values, at step 40b, the slowness may be calculated. Alternatively, prior to determining slowness, at step 35b the semblances may be interpolated locally around the semblance peaks or a search utilizing iteration algorithms may be utilized to find the true peak locations. Then, based on these more accurate peak locations, the slowness is calculated at step 40b.

Returning to step 10 of FIG. 1, and in accord with the invention, data compression may be accomplished by analytic sampling or by several different techniques which are the equivalent thereof. For a proposed sonic LWD tool, waveforms might be sampled at a 50 kHz rate in a passband located between 8–13 kHz, while in known sonic borehole tools, the waveforms are sampled, for example, at between 25 and 100 kHz with a passband between 1–2 kHz or 3–5 kHz depending on mode. Because the bandwidth of the filtered LWD waveforms would be about 5 kHz (1–2 kHz for DSI), the waveforms would be oversampled by a factor of about ten for the proposed LWD and by a factor of between 12.5 and 100 for the known DSI tools. Oversampling has always been considered necessary for STC processing which performs linear interpolation of the waveforms, because if linear interpolation is to be reasonably accurate, the waveforms must be oversampled. However, as set forth in more detail below, according to the invention, sampling is conducted at or slightly above the Nyquist frequency (twice the bandwidth of the bandpassed signal). Sampling at or about the Nyquist frequency reduces the amount of processing which is required.

Different band-pass sampling methods may be utilized. A first method is "integer band decimation and interpolation" which can be used if the lowest frequency of interest (f1) is an integer multiple of the bandwidth f2–f1, where f2 is the maximum frequency of the signal. Thus, for example, if the frequency band is taken from 8–16 kHz (instead of from 8–13 kHz), integer band decimation and interpolation may be utilized. According to this technique, if h(t) is the impulse response of a band-pass filter with a frequency band between f1 and f2, the waveform $x_m(t)$ can be sampled as $y_m(t)$ as follows:

$$y_m(t)=h(t)*x_m(t) \qquad (1a)$$

with decimation by the integral factor M, where * is the convolution operator. Therefore, the amount of data is reduced (compressed) by a factor of M. The original waveform within the frequency band f1 to f2 can be recovered from $y_m(t)$ according to:

$$x'_m(t)=h(t)*y_m(t) \qquad (1b)$$

with interpolation by the integer factor M. A comprehensive review of integer band decimation and interpolation may be found in R. E. Corchiere and L. R. Rabiner, *Multirate Digital Signal Processing*, pgs. 43–48 (Prentice Hall, 1983)

According to the invention, the preferred bandpass sampling method is quadrature modulation which is also known as analytic sampling. A comprehensive review of quadrature sampling may be found in R. E. Corchiere and L. R. Rabiner, *Multirate Digital Signal Processing*, pgs. 48–52 (Prentice Hall, 1983). According to quadrature modulation theory, the spectrum of a bandpassed real signal consists of two frequency bands and can be written as:

$$x(t)=s(t)e^{2\pi j f_o t}+\overline{s(t)}e^{-2\pi j f_o t} \qquad (2)$$

where s(t) is a low-pass function, $\overline{s(t)}$ is the complex conjugate of s(t) and $f_0$ is the center frequency of the band, and where the first term of equation (2) is known as the analytic signal ($x_a(t)$) of x(t). Since the center frequency $f_0$ is known, x(t) is completely determined by the lowpass signal s(t) or by the analytic signal $x_a(t)$. In quadrature sampling, the analytic signal ($s(t)e^{2\pi j f_o t}$) is modulated to baseband according to:

$$x(t)e^{-2\pi j f_o t}=s(t)+s(t)e^{-4\pi j(2f_o)t} \qquad (3)$$

so that the lowpass signal s(t) can be isolated by lowpass filtering. The lowpass signal may then be sampled at or around its Nyquist rate, with the real and imaginary parts of the complex-valued signal s(t) being the in-phase and quadrature components of the bandpass signal x(t). The quadrature samples may be remodulated to give samples of the analytic signal $x_a(t)$. Because the number of samples is the same, either the quadrature samples, or the analytic samples may be saved as the compressed data.

The actual implementation of quadrature sampling is straightforward. The original signals are multiplied separately by a cosine and by a sine at the modulation frequency $f_0$. The results are then lowpass filtered and sampled (decimated) at or slightly above the Nyquist rate in order to yield inphase and quadrature samples which may be stored or sent uphole as desired. To recover the original waveforms from the inphase and quadrature samples, the process is reversed. In particular, the Nyquist samples are first interpolated using the same lowpass filter and then the inphase and quadrature components are added together after multiplication by cosine and sine functions respectively.

Another bandpass filtering technique which is the equivalent of analytic sampling is single side band modulation which is described in detail in R. E. Corchiere and L. R. Rabiner, *Multirate Digital Signal Processing*, pgs. 52–56 (Prentice Hall, 1983). In this technique, the complex signal and its conjugate are modulated in the same manner as in quadrature modulation but by a different amount so as to produce respective sideband signals, and the sideband signals are summed. In particular, starting with equation (2), if $f_\Delta$ is the bandwidth of the complex signal s(t), then the side band signals $s_1(t)$, $s_2(t)$ of s(t) are generated by modulating s(t) by $e^{2\pi j f_\Delta t/2}$, and where $$s_1(t)=s(t)e^{2\pi j f_\Delta t} \qquad (4a)$$

and $$s_2(t)=s(t)e^{-2\pi j f_\Delta t} \qquad (4b)$$

Summing the two signals $s_1(t)$ and $s_2(t)$ gives a real signal Y(t), $$\begin{aligned} Y(t) &= s_1(t)+s_2(t) \\ &= Re(s(t))\cos(f_\Delta t/2)+Im(s(t))\sin(f t/2) \end{aligned} \qquad (4c)$$

where Re(s(t)) and Im(s(t)) are the real and imaginary parts of s(t). The real signal Y(t) may be sampled at its Nyquist rate. The signal s(t) and thence the signal x(t) may be recovered by modulating Y(t) by $e^{2\pi j f_\Delta t/2}$ and $e^{-2\pi j f_\Delta t/2}$, and lowpass filtering using a pass band $|f| \leq f_\Delta/2$. This produces the real and imaginary parts of s(t), from which the signal x(t) can be recovered as described above with respect to quadrature modulation.

Yet another bandpass filtering technique is known as windowed discrete cosine transform (windowed DCT) which is a type of sub-band coding. In this technique, the compression algorithm consists of applying a fast transform (i.e., the windowed DCT) to the bandpassed signal, and applying variable bit quantization to the transform coefficients. In variable bit quantization, no bits are assigned to frequency bands which are not of interest. In the bands of interest more bits may be allocated to frequencies of the most interest, and fewer bits for those frequencies of less interest. In other words, the coefficients for the frequencies of less interest are truncated. Details regarding windowed DCT and other sub-band coding techniques are found in A. Gersho, and R. M. Gray, *Vector Quantization and Image Compression*, Kluwer Academic (1992, Chapter 8, pp. 225–252).

Figure 2:
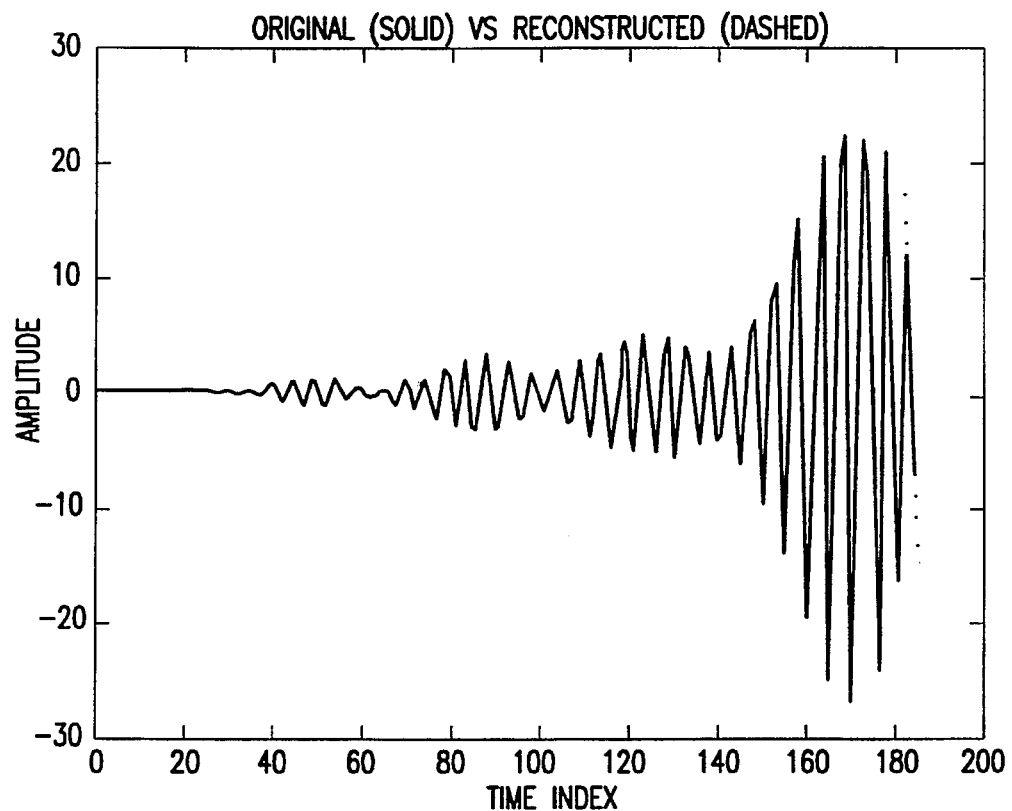
FIG. 2 shows graphs of a sonic waveform using conventional data acquisition and a reconstructed waveform using band-pass sampling.
Figure 3A:
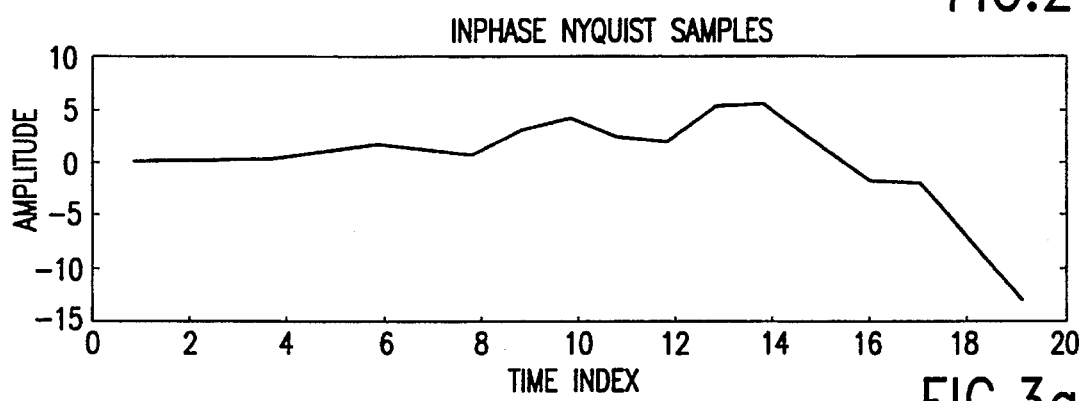
FIGS. 3a and 3b are the in-phase and quadrature components of the band-pass sampled data for the waveform of FIG. 2.
Figure 3B:
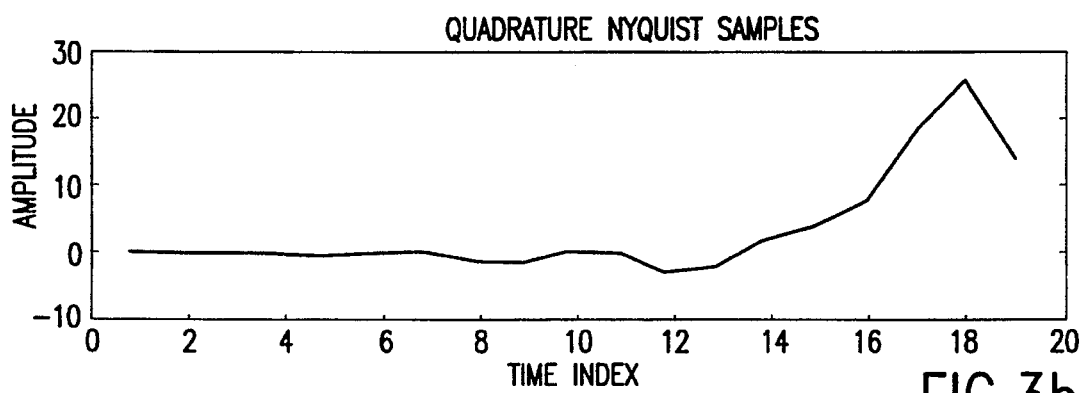

The effectiveness of quadrature sampling is seen with reference to FIGS. 2, 3a, and 3b. Field data acquired by a sonic tool in a conventional manner was obtained. The field data was subjected to quadrature sampling, and then reconstructed. The original sonic waveform and the reconstructed waveforms are seen overlaid on each other in FIG. 2, with the two being hardly distinguishable. In addition, the actual compressed data which are samples of the inphase and quadrature components are seen in FIGS. 3a and 3b respectively. It will be appreciated from FIGS. 2, 3a, and 3b that a large (five to one) compression is effected by the quadrature sampling. It will further be appreciated that since the sampled waveforms are relatively smooth as opposed to random, additional compression without data loss might be possible by applying additional compression techniques such as run-length encoding, Huffman coding, Lempel-Ziv-Welch compression, etc. to the quadrature sampled data.

Figure 4A:
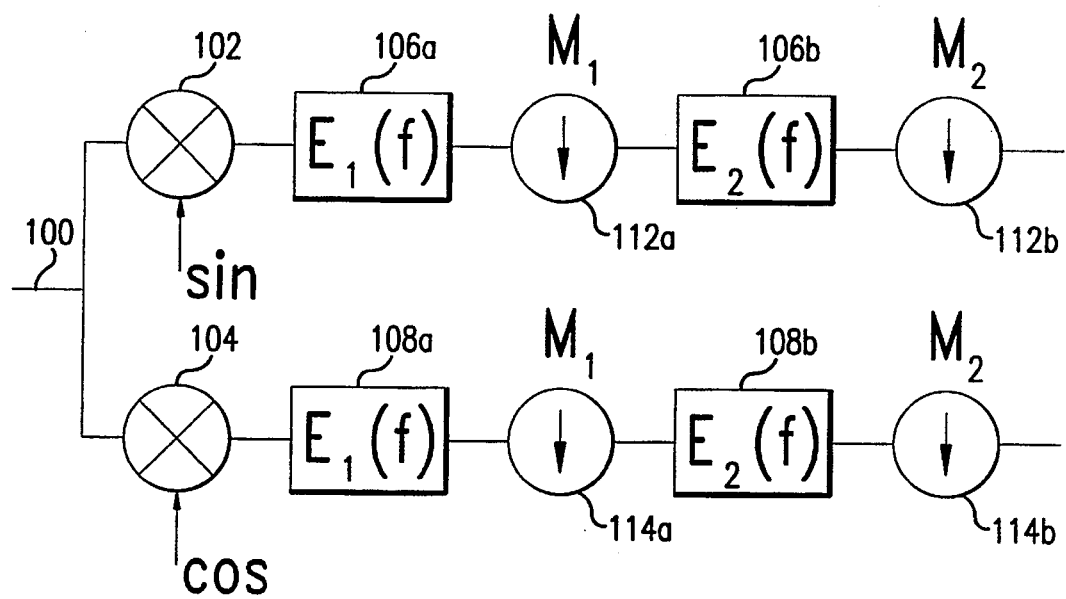
FIGS. 4a and 4b are respectively block diagrams of a multistage multirate compression bandpass filter and a reconstruction filter
Figure 4B:
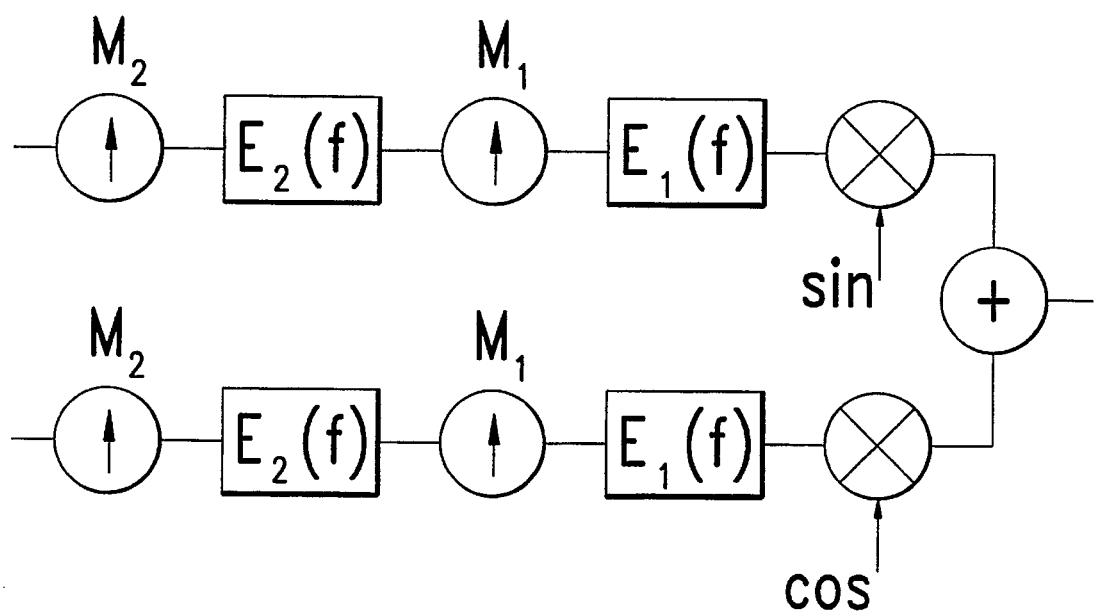
Figure 5A:
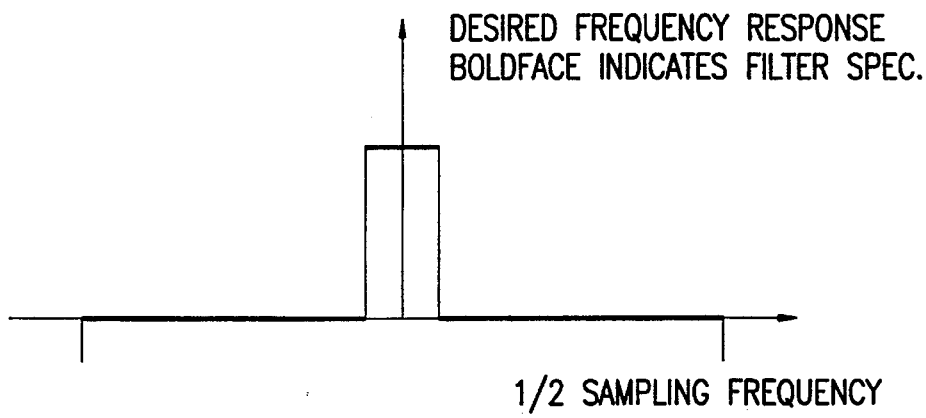
FIGS. 5a–5c illustrate a desired filter frequency response, and the frequency responses of stages of filters used to obtain the desired filter frequency response.
Figure 5B:
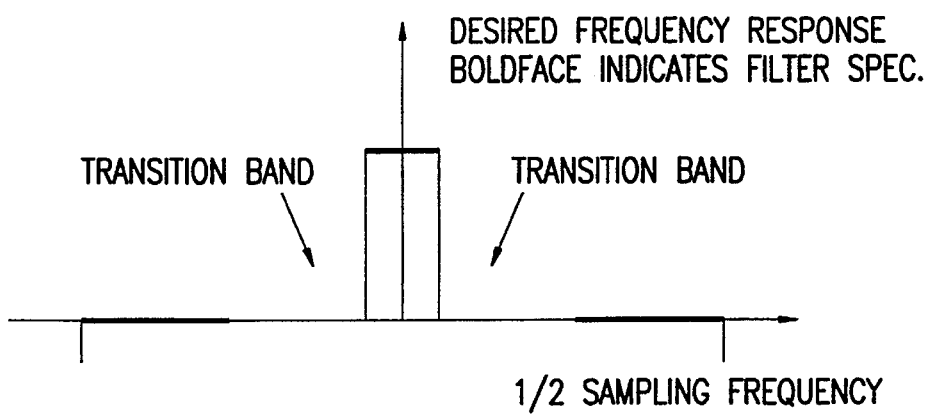
Figure 5C:
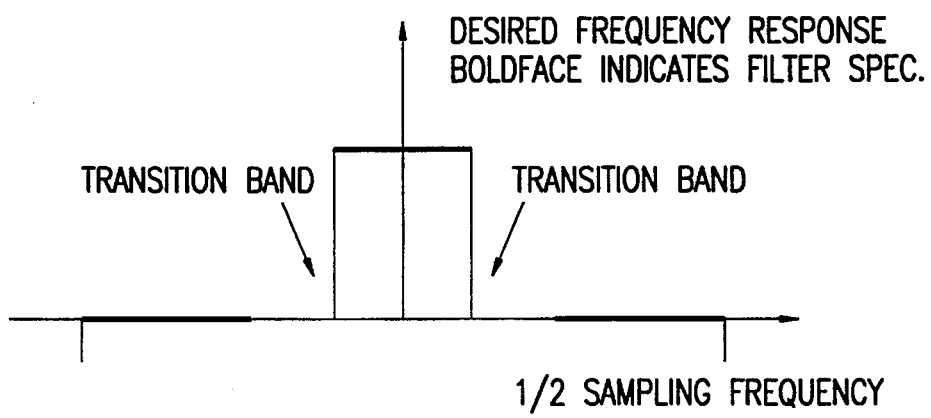

Turning to FIG. 4a, a multistage, multirate, quadrature sampling filter which can add further efficiency to the sonic data sampling process is seen. As seen in FIG. 4, the incoming signal 100 is modulated by multiplying at 102 and 104 respectively by the sine and cosine functions. Filtering and decimation of each component is then accomplished in stages with filters 106a, 106b, . . . , 108a, 108b, . . . and decimators 112a, 112b, . . . and 114a, 114b . . . . The efficiency of such an arrangement is obtained due to the fact that the signal is processed at increasingly lower rates. This may be understood with reference to the implementation of a narrowband lowpass filter required in LWD applications. The desired LWD frequency response is seen in FIG. 5a and consists of a narrow passband and a wide stopband. If such an arrangement were to be implemented in a single stage (i.e., a single FIR filter) a vary narrow transition band would have to be specified (i.e., a high number of filter coefficients). By using a series of filter stages, however, the filters may be much simpler such that they may be implemented with fewer mathematical operations. For example, as seen in FIG. 5b, a first stage filter (106a, 108a of FIG. 4) is provided with a passband, a wide transition band, and a stopband which occupies half the available bandwidth. With a wide transition band, a low order FIR filter may be used in implementation. The output of the first stage has half the bandwidth of the original signal and may therefore be decimated by a factor of two at decimators 112a, 114a. The process is now repeated until the desired bandwidth is achieved. Thus, the second stage has a filter 106b, 108b with a desired response as illustrated in FIG. 5c. Here the passband is wider, the stopband is still half the bandwidth, and the transition band is narrower. Again, a low order filter can fulfill this specification. The filtered signals are then decimated again at decimators 112b, 114b. The process may be repeated an optimal number of times until the desired bandwidth is achieved. The optimum may be chosen based on calculation time required, and economic considerations. When a multistage, multirate sampling filter is utilized, data recovery is obtained with a multistage, multirate interpolator as will be appreciated by one skilled in the art.

Once the data has been compressed by quadrature sampling or the other bandpass filtering techniques discussed above, the data may either be recovered using interpolation and remodulation, or may be used in its compressed state for further processing. Recovery by interpolation is seen with reference to FIG. 4b where the compressed signal is interpolated at interpolators 122a, 124a, filtered by filters 126a, 128a (which are the same as filters (106b and 108b), interpolated again at interpolators 122b, 124b, filtered again by filters 126b, 128b (which are the same as filter 106a and 106b), multiplied at 132 and 134 by a sine and cosine function, and summed at 136. The data thus recovered may be subjected to prior art beamforming (stacking) or semblance techniques to provide information from which determinations may be made regarding formation and/or borehole characteristics. Alternatively, and in accord with a preferred aspect of the invention, the compressed data is subjected in its compressed form to an improved beamforming and/or semblance technique.

The improved beamforming and/or semblance technique of the invention comprises beamforming the complex analytic signal $x_a(t)$ rather than the real bandpass signal x(t), and conducting the beamforming over a coarse time and slowness grid. However, before describing the improved techniques in detail, background information regarding beamforming and semblance determinations is helpful.

Typically, sonic tools include a plurality of receivers or sensors (e.g., M receivers) which are spaced from a reference point by distances $\Delta z_k$. The receivers simultaneously sample a continuous time waveform x(t) at intervals of $\Delta T$. The objective is to estimate the slowness (velocity$^{-1}$) of a wave propagating across the receiver array. Beamforming consists of summing appropriately time-shifted versions of the receiver waveforms according to:

$$b(\tau,p) = \sum_{k=0}^{M-1} x_k(\tau - (k\Delta z_k)p) \quad (5)$$

where k indexes the receiver, and b($\tau$,p) is the resulting summation over time variable $\tau$ and slowness variable p. It will be appreciated that equation (5) represents the sum (i.e., the stacking or beamforming) of the physical waveforms that lie on a line or "beam" of slope p. In the typical situation where the receivers are equally spaced apart, this stacking is accomplished by delaying the k-th waveform by an amount k$\Delta z$, (where $\Delta z$ is the distance between adjacent receivers) which corresponds to the time required for a wave propagating with slowness p to reach the k-th sensor. For a wave propagating across the array at slowness $p_0$, a maximum for |b($\tau$,p)| would be expected at the time $\tau$ (for the slowness $p_0$) which the wave reaches the array.

Beamforming has been helpful in obtaining information regarding formation slowness. However, because energy in the waveforms is dominated by modes other than the compressional arrival, other techniques such as semblance calculation have been considered to provide superior results. In semblance calculations, a normalized beamformed output is calculated according to:

$$\alpha(\tau,p) = \frac{\sum_{t=\tau}^{\tau+T} |b(t,p)|^2}{M \sum_{t=\tau}^{\tau+T} \sum_{k=0}^{M-1} |x_k(t - (k\Delta z)p)|^2} \quad (6)$$

which may be understood as the normalized averaged squared magnitude of the beamformer output of equation (5) in a time window of length T time samples, where the normalization is by the energy in the time window. The numerator of equation (6) is called the coherent energy, while the denominator is called the incoherent energy. According to the prior art STC method, the quantity $\alpha(\tau,p)$ is computed on a discrete grid in the time-slowness (($\tau$,p) plane), and searches are conducted for local maxima or peaks.

Figure 6:
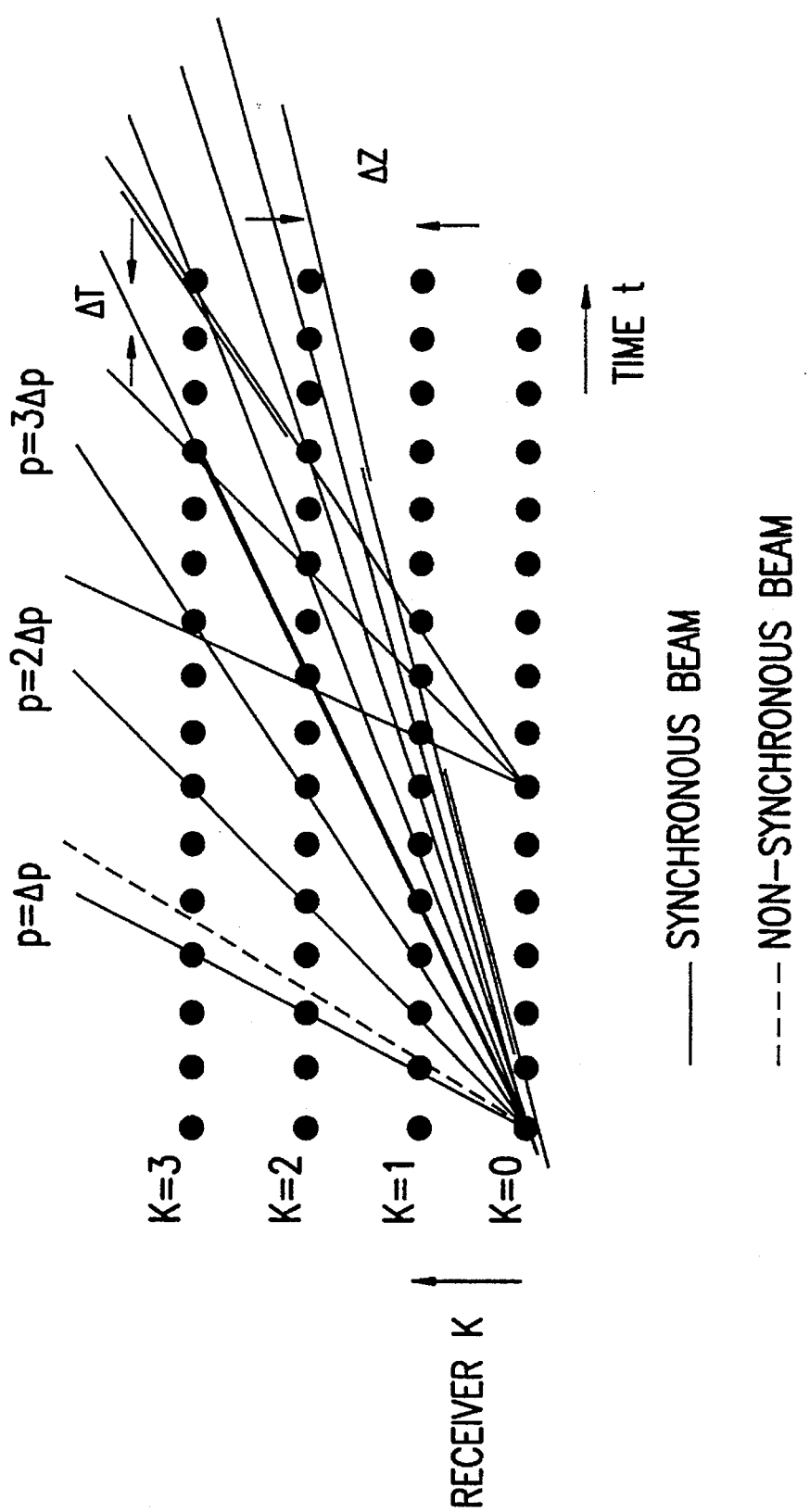
FIG. 6 is a schematic diagram showing receiver locations and time samples and indicating synchronous beams used in beamforming and non-synchronous beams.

In practice, it is desired to provide formation slowness estimates to within one to two microseconds per foot. Thus, according to STC methods, computations of $\alpha(\tau,p)$ are made at intervals of one microsecond per foot in the slowness-time plane. This is only possible if the spacing $\Delta p$ between synchronous beams (where a synchronous beam is a line on which every waveform has a time sample as seen in FIG. 6) is equal to one microsecond per foot where $\Delta p = \Delta T/\Delta z$. Since the spacing between sensors ($\Delta z$) is fixed, the necessary synchronous beam density can be achieved only by adjusting the temporal sample interval $\Delta T$. In LWD tools, for a typical receiver spacing of about eight inches, and a slowness step of one microsecond per foot, the required sample interval $\Delta T$ is about ⅔ a microsecond; i.e., a rate of 1.5 MHz. Since waveforms are typically (over)sampled in LWD tools at around 50 kHz, linear interpolation is required. Likewise, in DSI tools, for a typical receiver spacing of six inches and a slowness step of one microsecond per foot, the required sample interval $\Delta T$ is about ½ a microsecond; i.e., a rate of 2 MHz. Since waveforms in sonic borehole tools are typically oversampled at between 25–100 kHz, again, linear interpolation is required.

Turning back to the invention, an improved STC processing method is provided. As mentioned above, the improvements to the STC processing are made in beamforming the complex analytic signal rather than the real bandpass signal, and in sampling the semblance $\alpha(\tau,p)$ efficiently (i.e., on a course grid) in order to reduce the number of computations required. With regard to the beamforming, instead of beamforming the real bandpass signals, only the analytic part $x_a(t)$ of the bandpass signal of equation (3) is beamformed based on equation (5) according to:

$$b_a(\tau,p) = \sum_{k=0}^{M-1} x_{a,k}(\tau - (k\Delta z)p) \quad (7)$$

Similarly, only the analytic part of the waveform is used in computing the denominator during the semblance calculation according to:

$$\alpha_a(\tau,p) = \frac{\sum_{t=\tau}^{\tau+T} |b_a(t,p)|^2}{M \sum_{t=\tau}^{\tau+T} \sum_{k=0}^{M-1} |x_{a,k}(t - (k\Delta z)p)|^2} \quad (8)$$

Figure 7A:
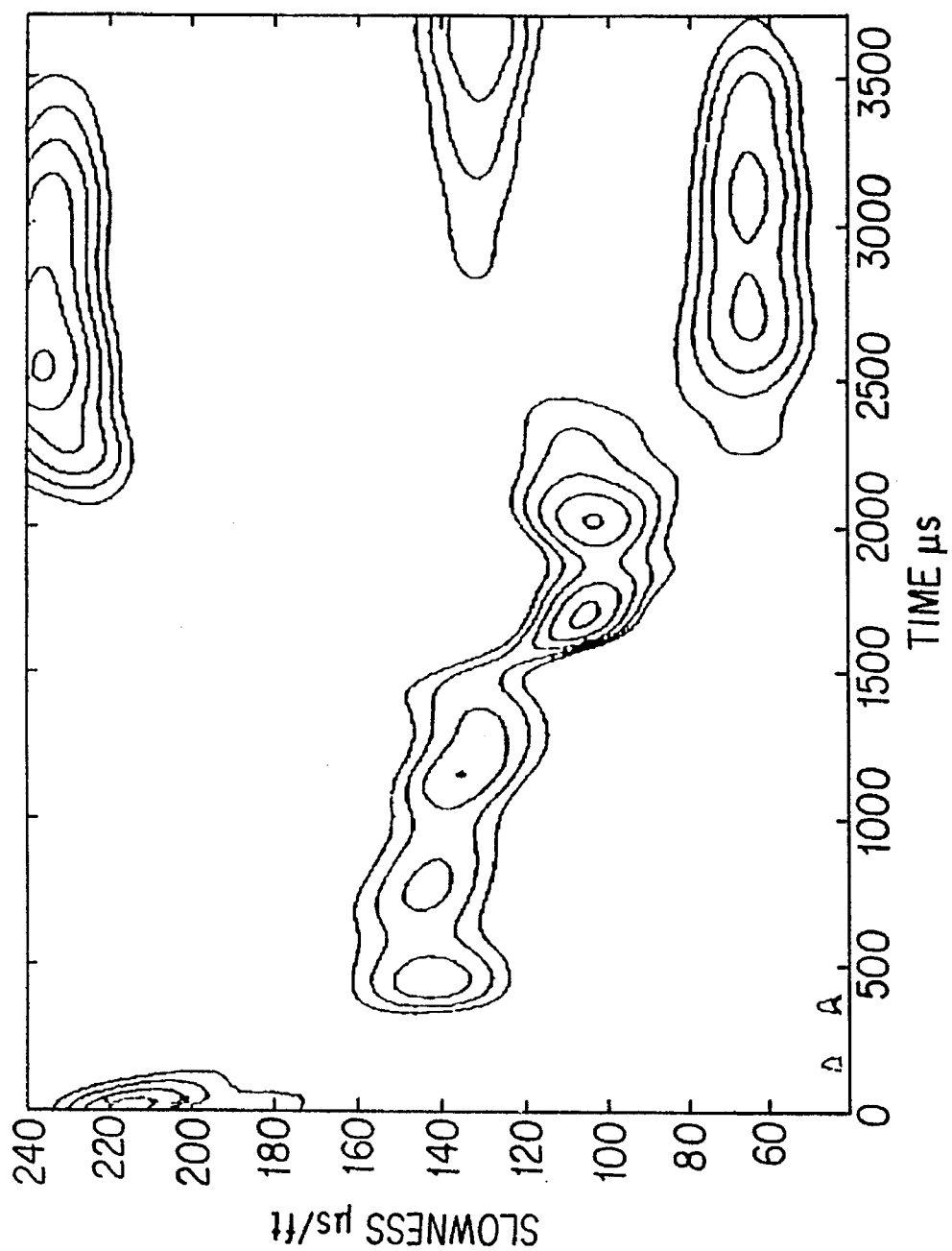
FIGS. 7a and 7b are STC plots obtained via the improved STC processing of the invention and via the prior art STC processing where the starting data were the same.
Figure 7B:
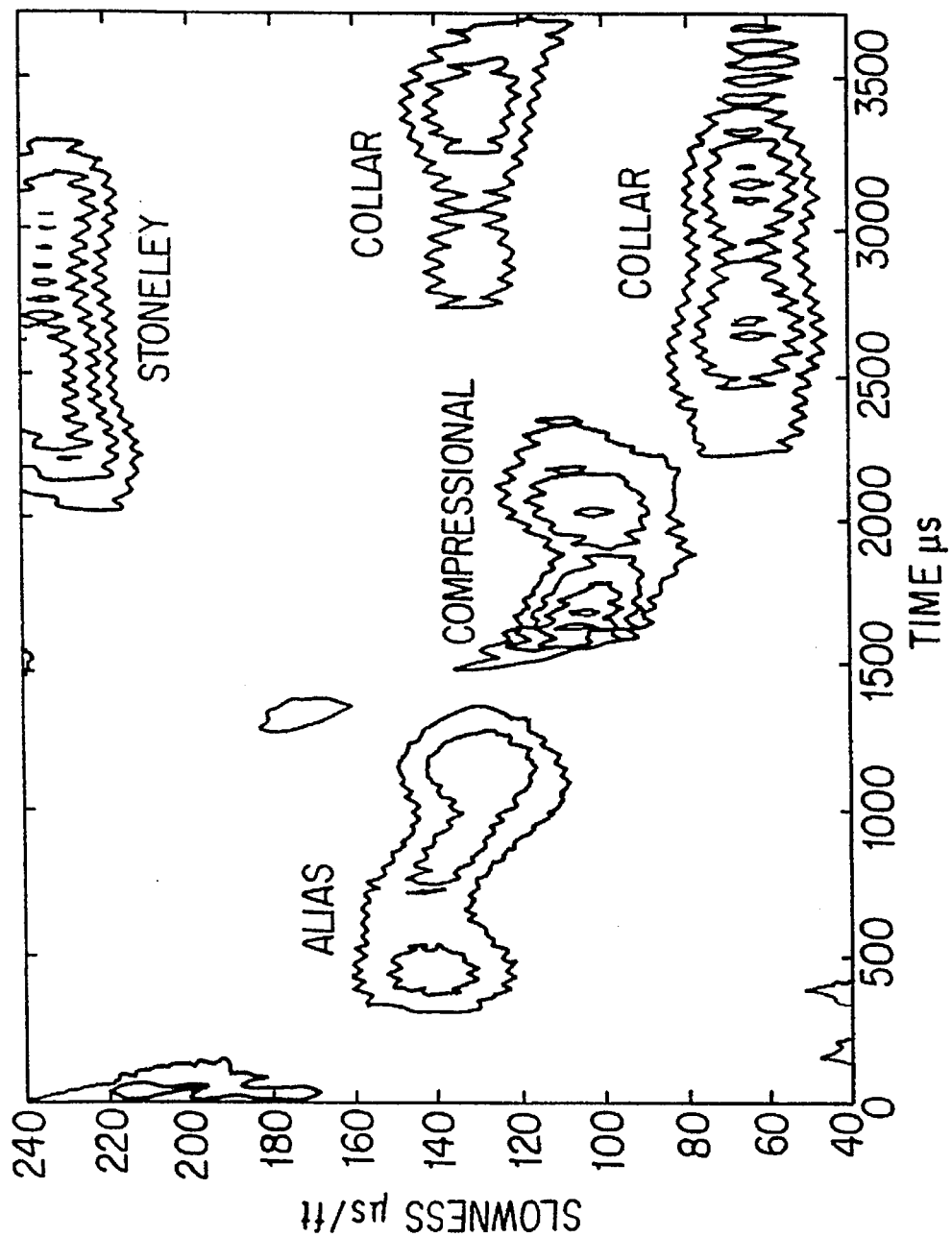

This results in a semblance function which is much smoother than the prior art semblance functions (as may be seen by comparing FIGS. 7a and 7b) because in beamforming real bandpass signals, the squaring function generates high frequency side lobes which introduce roughness. As a result of the smoother semblance function, it is possible to use a much shorter rectangular smoothing window to improve resolution since it is not necessary to smooth out high frequencies. Thus, fewer samples are required.

According to the second improvement of the improved STC processing method, the semblance $\alpha_a(\tau,p)$ of equation (8) is calculated efficiently by taking advantage of the bandwidth of the receiver waveforms, and thus reducing the number of points that must be computed in the ($\tau$,p) plane. In particular, $\alpha_a(\tau,p)$ is computed for the complex analytic signal on a coarse grid defined by the Nyquist frequency for the bandwidth of the bandpassed signal. Where the typical bandwidth of a lowpass LWD signal is e.g., 5 kHz, and the distance between the reference detector and the furthest located detector is about two feet, the Nyquist slowness step $½f_2(z_M - z_1)$ for the semblance (i.e., the squared analytic portion of the beamformed signal according to equation 6) would be approximately ½*(2*5,000)*2 ft, or approximately twenty-five microseconds/foot (although this may be increased to almost fifty microseconds/foot by choosing the reference detector to be a middle detector and thus the "furthest" located detector would be located at about one foot). Likewise, for dipole sonic imaging (DSI) signals where the furthest located detector can be spaced at about three and half feet from the source, and the largest bandwidth is about 2 kHz, the Nyquist slowness step for the semblance would be approximately ½*(2*2000)*3.5 ft, or approximately thirty-six microseconds/foot. While it might be possible to use a coarse grid of twenty-five microseconds/foot for such a LWD tool and of thirty-six microseconds/foot for such a DSI tool, even computing $\alpha_a(\tau,p)$ on a coarse grid of fifteen microsecond/foot steps clearly reduces the amount of computation required (while still being fine enough for peak discrimination) as opposed to steps of one microsecond/foot used in the prior art. For both DSI and LWD tools, where detectors are typically spaced eight inches apart, in order to compute $\alpha_a(\tau,p)$ at fifteen microsecond/foot slowness steps, it is sufficient to interpolate the waveforms to a ten microsecond sampling interval ($\Delta T = \Delta z * \Delta p$) or 100 kHz sample rate. This compares favorably to the 1.5 MHz sample rate used in prior art STC processing.

It is not necessary to have even a sampling rate of 100 kHz to compute the average signal energy in a time window. Rather, since the analytic part of the energy, as mentioned above, is a lowpass function, it is sufficient to sum time-samples at a much larger interval closer to the Nyquist interval. For bandpassed LWD waveforms, for example, having a 5 kHz bandwidth (8–13 kHz), the Nyquist interval for the squared waveform is approximately 100 microseconds, and the squared time samples may be summed at that interval (or faster as desired). Summing fewer time samples within the typically 500 microsecond long window saves additional computation. In fact, by choosing the interval properly, even fewer computations need be conducted. For the example set forth above where a ten microsecond sampling interval is chosen, and with reference to FIG. 6, it will be appreciated that a summing interval of 60 microseconds might be ideal. With such a summing interval, the analytic signal would be calculated for detector k=0 at every sixty microseconds; for detector k=1 at every ten microseconds; for detector k=2 at every twenty microseconds; and for detector k=3 at every thirty microseconds. Because the summing interval is properly chosen for the particular microsecond sampling interval (and the number of detectors), it will be appreciated that many of the same calculations are reused in each of the beamforming equations, thereby reducing the number of interpolations required.

Once $\alpha_a(\tau,p)$ is calculated, in accord with the invention, and as discussed above, a search is conducted to find semblance peaks (i.e., maximum values). Based on the peak values, a slowness may be calculated as described in the prior art. Alternatively, and also in accord with prior art teachings, prior to determining slowness, the semblances may be interpolated locally around the semblance peaks or a search utilizing iteration algorithms may be utilized to find the true peak locations. Then, based on these more accurate peak locations, the slowness is calculated. Details regarding semblance peak searching, local interpolation, etc. may be found in "Semblance Processing of Borehole Acoustic Array Data" *Geophysics*, Vol. 49, No. 3, March 1984 pp. 274–281, as well as in U.S. Pat. No. 4,594,691 to Kimball et al.

It will be appreciated that the improved STC processing can be conducted either downhole by a processor means in the MWD or DSI tool, or uphole as desired. Because the data transmission rates in MWD tools is very limited, downhole processing is highly desirable in MWD tools. Once the improved STC processing is accomplished, and the slowness calculated, the results may be sent uphole using mud pulse telemetry.

Figure 8:
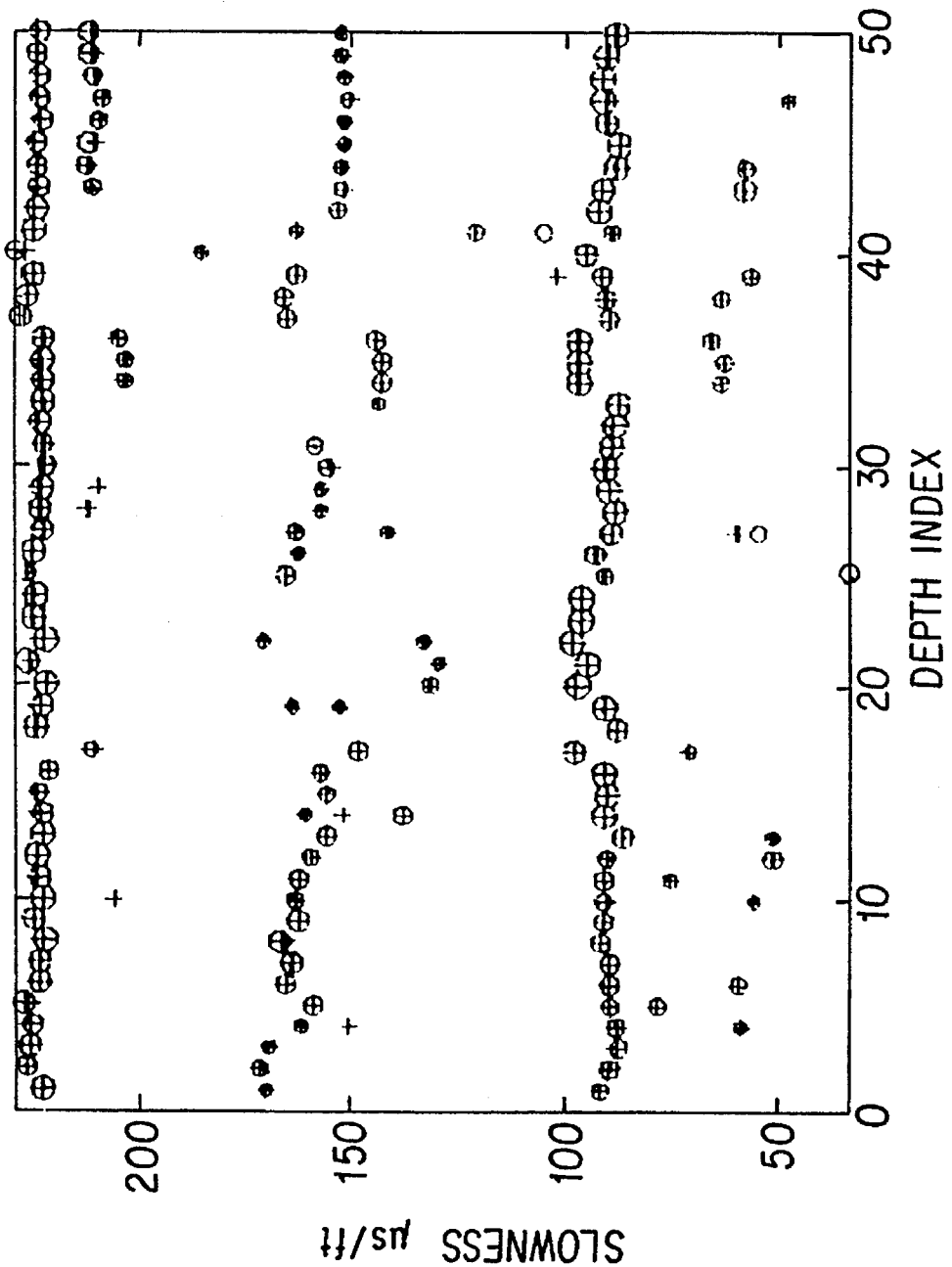
FIG. 8 is a slowness plot which compares the slownesses computed by the processing method of FIG. 1 with the slownesses computed by the prior art STC method.

Regardless of where the processing is conducted, the results of the improved STC processing method are excellent. Using the same starting data, slowness determinations were made using the prior art STC processing method and using the improved STC processing method. A comparison of the results are shown in FIG. 8, where it can be seen that the results show excellent correlation. It should be noted that in the few locations where the results do not exactly agree, it is possible that the improved STC processing method (which is typically about fifteen times faster than the prior art STC processing method) is the more accurate determination. This may be understood by appreciating that the squaring of the entire signal (as opposed to the analytic signal) as is done in the prior art semblance calculations can introduce high frequency disturbances which can cause an incorrect peak determination.

While data compression via bandpass sampling is particularly advantageous and may be processed advantageously in the improved STC processing method described above, it should be appreciated by those skilled in the art that the processing rates of the standard beamforming and STC methods may be improved by utilizing the concepts of the improved STC processing method of sampling on a grid determined by the Nyquist steps. In particular, it should be appreciated that $b(\tau,p)$ of equation (5) is the sum of band-limited waveforms, and is therefore band-limited itself in $\tau$ and p. The bandwidth in $\tau$ is $2f_2$ where $f_2$ is the highest positive frequency in the waveforms $x_k$, while the bandwidth in p is $2f_2$ times $z_M-z_1$. The Nyquist steps for $b(\tau,p)$ are $\frac{1}{2}f_2$ for $\tau$, and $1/(2f_2(z_M-z_1))$ for p. As set forth above, the coherent and incoherent energies utilized in STC processing may be found from $b(\tau,p)$ according to equation (6). By squaring $b(\tau,p)$, the bandwidth of the coherent and incoherent energies become twice the bandwidth of $b(\tau,p)$. Thus, the $\tau$ and p bandwidths of the coherent and incoherent energies may be sampled at their respective Nyquist steps when determining semblance. Once the semblance calculations have been made at those sampling rates, peaks may be found based on the semblance calculations, or based on interpolations thereof. From the peak values, slowness estimates are determined.

There have been described and illustrated herein methods for processing sonic wave information. While particular embodiments of the invention have been described, it is not intended that the invention be limited thereto, as it is intended that the invention be as broad in scope as the art will allow and that the specification be read likewise. Thus, while the invention was disclosed as primarily utilizing bandpass filtering, the term "bandpass" filtering should be understood in a broad sense to include the lowpass filtering embodiment described, as well as other lowpass filtering, since lowpass filtering passes a band which typically starts at a dc frequency. Also, while particular bandpass filtering and sampling techniques were described for use in data compression, it will be appreciated that other compression techniques which effectively provide a bandpassed signal could be utilized in lieu thereof. Further, while particular frequencies and bandwidths were described for particular types of signals, it will be appreciated that these examples were by way of description and not by way of limitation, and the invention can be applied to signals of other frequencies and bandwidths. It will also be appreciated that while the slowness and/or time sample steps over which the stacking or semblance function were calculated were described as being chosen to be at or near the Nyquist rate for optimal processing speed, improvement over the prior art will be obtained by substantially increasing the sampling steps over the steps used in the prior art even if they are not at or near the Nyquist rate. Furthermore, while the invention was described with reference to a particular type of sonic tool with, e.g., a plurality of evenly spaced receivers, it will be appreciated that the invention applies broadly to different sonic tools, and may be applied regardless of receiver spacing and other sonic tool particulars. It will therefore be appreciated by those skilled in the art that yet other modifications could be made to the provided invention without deviating from its spirit and scope as so claimed.

We claim:

1. A method for processing sonic logging data obtained from a borehole tool in a formation, said sonic tool having a sonic source, and a plurality of sonic receivers which are spaced apart from a reference point by distances $\Delta z_k$ and which provide receiver waveforms $x_k$, said method comprising:

a) beamforming said sonic logging data by summing appropriately time-shifted versions of said receiver waveforms according to $$b(\tau,p) = \sum_{k=0}^{M-1} x_k(\tau - (k\Delta z_k)p)$$

where k indexes said plurality of spaced sonic receivers, and $b(\tau,p)$ is a summation over a time variable $\tau$ and a slowness variable p; and b) based on said summation, calculating semblance function values for said sonic logging data, wherein said semblance function values are calculated over a slowness-time grid utilizing a slowness step which is chosen based on the Nyquist sampling rate for the semblance function which relates to twice the bandwidth of said beamformed summation and to a distance between the furthest spaced of said plurality of spaced sonic receivers.

2. A method according to claim 1, further comprising:

c) finding a slowness value for the formation by utilizing said semblance function values.

3. A method for processing sonic logging data obtained from a borehole tool in a formation, said sonic tool having a sonic source, and a plurality of sonic receivers which are spaced apart from a reference point by distances $\Delta z_k$ and which provide receiver waveforms $x_k$, said method comprising:

a) beamforming said sonic logging data by summing appropriately time-shifted versions of said receiver waveforms according to $$b(\tau,p) = \sum_{k=0}^{M-1} x_k(\tau - (k\Delta z_k)p)$$

where k indexes said plurality of spaced sonic receivers, and $b(\tau,p)$ is a summation over a time variable $\tau$ and a slowness variable p, and wherein said beamforming is calculated on a slowness-time grid utilizing a slowness step which is chosen based on the Nyquist sampling rate for $b(\tau,p)$ which relates to the bandwidth of said beamformed summation and to a distance between the furthest spaced of said plurality of spaced sonic receivers, thereby obtained coherence stacks; and b) searching said coherence stacks to find a peak value.

4. A method according to claim 3, further comprising:

c) utilizing said peak value to find a slowness value for the formation.

5. A method of processing sonic logging data obtained in a borehole to determine properties of formations surrounding the borehole, comprising:

a) bandpass filtering the data to obtain filtered signals;

b) defining a slowness-time plane to relate the sonic logging data to formation properties;

c) providing compressed signals by sampling the filtered signals at a sampling rate chosen such that the slowness-time plane can be reconstructed from the compressed signals; and d) processing the compressed signals to determine formation properties.

6. A method as claimed in claim 5, wherein the sampling rate is not less than a Nyquist rate for reconstruction of the slowness-time plane.

7. A method as claimed in claim 5, wherein the processing step comprises reconstruction of the compressed signals.

8. A method as claimed in claim 5, wherein the processing step comprises analysis of unreconstructed compressed signals to determine formation properties.

9. A method as claimed in claim 5, wherein the sonic logging data are obtained with a downhole tool, the steps of bandpass filtering and sampling are performed downhole in the tool.

10. A method as claimed in claim 9, wherein the compressed signals are transmitted from the tool to a surface location where the processing step is performed.

11. A method as claimed in claim 9, wherein the compressed signals are stored in the tool and the processing step is performed after the tool is removed from the borehole.

12. A method as claimed in claim 5, wherein the bandpass filtering utilizes a frequency band having a highest frequency of interest which is an integer multiple of a lowest frequency of interest, and the bandpass filtering step and the sampling step are conducted according to an integer band decimation technique wherein sonic logging data $x_m(t)$ are sampled in the frequency band as $y_m(t)$ according to $y_m(t) = h(t)*x_m(t)$ where $h(t)$ is an impluse response of the bandpass filter and * is a convolution operator.

13. A method as claimed in claim 5, wherein the bandpass filtering and sampling are conducted according to a quadrature modulation technique which comprises:

i) multiplying the sonic logging data separately by a cosine function and by a sine function at a desired modulation frequency to obtain modulated data;

ii) bandpass filtering the modulated data using a lowpass filter of predetermined bandwidth to obtain modulated filtered signals; and iii) samping the modulated signals at a rate near a Nyquist rate for the predetermined bandwidth to yield inphase and quadrature samples constituting the compressed signals.

14. A method as claimed in claim 5, wherein the bandpass filtering step and the sampling step are conducted according to a single side band modulation technique which comprises:

i) multiplying the sonic logging data separately by a cosine function and by a sine function at a desired modulation frequency to obtain modulated data;

ii) bandpass filtering the modulated data using a lowpass filter of predetermined bandwidth to obtain modulated filtered signals; and iii) sampling the modulated filtered signals at a rate near the Nyquist rate for the predetermined bandwidth to yield a single side band signal which constitutes the compressed signals.

15. A method as claimed in claim 5, wherein the sampling step is conducted according to a windowed discrete cosine transformation technique in which the filtered signals are transformed by a fast transform so as to obtain transform coefficients, and the transform coefficients are subjected to bit quantization.

16. A method as claimed in claim 5, further comprising calculating semblance functions for the compressed signals, searching the semblance funtions for a first peak value, and determining a slowness value for the formation from the first peak value.

17. A method as claimed in claim 16, wherein the searching step comprises finding a preliminary peak value and interpolating the semblance functions around the preliminary peak value to find the first peak value.

18. A method as claimed in claim 5, wherein the data are obtained from a tool which comprises a plurality of spaced receivers and the step of bandpass filtering is performed using a bandpass filter of predetermined bandwidth, the processing step further comprising calculating semblance functions for the data over the slowness-time plane utilizing a slowness step which is chosen based on the Nyquist sampling rate for the semblance which relates to the bandwidth of the bandpass filter and to a distance separating the receivers which are spaced furthest apart.

19. A method as claimed in claim 18, wherein the slowness step is chosen to be greater than 5 microseconds per foot.

20. A method as claimed in claim 18, wherein the slowness-time plane utilizes a time step which is chosen based on the Nyquist sampling rate for the semblance which relates to the bandwidth of the bandpass filter.

21. A method as claimed in claim 18, wherein the processing step further comprises calculating analytic portions of the compressed signals and calculating the semblance functions for the analytic portions.

22. A method as claimed in claim 21, wherein the sampling rate is chosen based on the slowness step and the spacing between the receivers.

23. A method as claimed in claim 22, wherein the sampling rate is chosen to be at least 10 microseconds.

24. A method as claimed in claim 22, further comprising calculating the semblance functions at a time interval based on the Nyquist rate of a square of the filtered signals and based on the spacing between the receivers.

25. A method as claimed in claim 24, wherein the analytic portions are found for individual receivers based on the time interval and the sampling rate.

26. A method as claimed in claim 25, wherein the time interval and the sampling rate are chosen to be related to the number of receivers, and analytic portions are found for a first receiver at the time interval and for a second receiver at the sampling rate.

27. A method of processing sonic logging data obtained in a borehole to determine properties of formations surrounding the borehole, comprising:

a) bandpass filtering the data to obtain filtered signals;

b) defining a slowness-time plane to relate the sonic logging data to formation properties;

c) providing compressed signals by sampling the filtered signals at a sampling rate chosen such that the slowness-time plane can be reconstructed from the compressed signals;

d) stacking the compressed signals to obtain coherence stacks; and e) processing the coherence stacks to determine formation properties.

28. A method as claimed in claim 27, wherein the step of processing the coherence stacks comprises searching the coherence stacks to find a peak value.

29. A method as claimed in claim 28, further comprising determining a slowness value for the formation from the peak value.

30. A method of processing sonic logging data obtained in a borehole to determine properties of formations surrounding the borehole, comprising:

a) bandpass filtering the data to obtain filtered signals;

b) defining a slowness-time plane to relate the sonic logging data to formation properties;

c) providing compressed signals by sampling the filtered signals at a sampling rate chosen such that the slowness-time plane can be reconstructed from the compressed signals;

d) finding analytic portions of the compressed signals, and e) processing the analytic portions to determine formation properties.

31. A method as claimed in claim 30, wherein the processing step comprises stacking the analytic portions to obtain coherence stacks which are used to determine formation properties.

32. A method as claimed in claim 31, further comprising searching the coherence stacks to find a peak value and using the peak value to determine a formation slowness value.

33. A method as claimed in claim 30, further comprising calculating semblance functions of the analytic portions, searching the semblance values to find a first peak value and determining a slowness value for the formation using the first peak value.

34. A method as claimed in claim 33, wherein the step of searching the semblance functions comprises finding a preliminary peak value and interpolating the semblance functions around the preliminary peak value to find the first peak value.

\* \* \* \* \*